United States Patent

Brophy et al.

[11] Patent Number: 6,070,089
[45] Date of Patent: May 30, 2000

[54] METHOD AND APPARATUS FOR CONTROL OF VOCODER BYPASS UTILIZING INBAND SIGNALING

[75] Inventors: John Douglas Brophy, Arlington Heights; James Patrick Ashley, Naperville; Lee Michael Proctor, Cary; Krsman Martinovich, Streamwood, all of Ill.

[73] Assignee: Motorola, Inc., Schaumburg, Ill.

[21] Appl. No.: 09/229,230

[22] Filed: Jan. 12, 1999

Related U.S. Application Data

[63] Continuation-in-part of application No. 09/138,183, Aug. 21, 1998.

[51] Int. Cl.[7] ...................................................... H04Q 7/00
[52] U.S. Cl. ........................ 455/560; 455/422; 455/445; 375/242; 704/221; 704/214; 704/233; 370/522
[58] Field of Search .................................... 455/560, 403, 455/445, 422, 501, 507, 517, 524, 550; 379/229, 219, 350, 353, 407; 370/287, 374, 378, 384–385, 522; 375/219, 242–243, 254, 277; 704/221, 214, 233

[56] References Cited

U.S. PATENT DOCUMENTS

| | | | |
|---|---|---|---|
| 5,608,779 | 3/1997 | Lev et al. | 455/436 |
| 5,729,536 | 3/1998 | Doshi et al. | 370/328 |
| 5,768,308 | 6/1998 | Pon et al. | 455/445 |
| 5,793,810 | 8/1998 | Han et al. | 455/422 |
| 5,956,673 | 9/1999 | Weaver, Jr. et al. | 704/221 |

*Primary Examiner*—Doris H. To
*Attorney, Agent, or Firm*—John B. MacIntyre; Sayed Hossain Beladi

[57] ABSTRACT

Vocoder bypass is provided using a combination of out-of-band and in-band signaling. In preferred embodiments of the present invention, two signaling channels are arranged for transmission within the compressed speech. Each of the signaling channels are communicated at a preferred rate to permit fast, reliable detection of conditions indicating vocoder bypass mode of operation and to synchronize and communicate compressed speech in a vocoder bypass mode of operation.

21 Claims, 5 Drawing Sheets

METHOD AND APPARATUS FOR CONTROL OF VOCODER BYPASS UTILIZING INBAND SIGNALING

This application is a continuation in part of Ser. No. 09/138,183 filed Aug. 21, 1998.

FIELD OF THE INVENTION

The present invention relates generally to digital communication systems including a vocoder, and more particularly, to a method and apparatus for control of vocoder bypass operation utilizing inband signaling.

BACKGROUND OF THE INVENTION

Digital communication systems, and particularly, digital cellular and personal communication system (PCS) systems, include vocoding. Vocoding is the operation of digitally coding speech for transmission. For example, in digital cellular applications both the mobile, i.e., the cellular telephone, and the cellular infrastructure, i.e., the ground based equipment providing service to the mobile, each include a vocoder. In a typical cellular system, the vocoding permits substantial compression of the speech information to be transmitted and is particularly useful for increasing capacity of the cellular system.

In a mobile-to-mobile call, there is double stage speech encoding/decoding (or "tandem vocoding") unless some scheme is provided to bypass vocoder operation in the cellular infrastructure. This is explained as follows. In the mobile-to-mobile call, the mobile transmitting on the uplink uses its vocoder to encode the uplink speech. The cellular infrastructure automatically decodes the uplink speech, which is necessary if the speech is to be transmitted to a land line telephone (i.e., to the public switched telephone network), to an analog portion of the cellular communication system, or to a similar non-digital portion of the communication system. However, where the speech is to be transmitted to a mobile having digital capability, the speech must be re-encoded for digital transmission to the mobile. Tandem vocoding results in a significant reduction in perceived voice quality as compared to single stage vocoding (i.e., mobile-to-land line or land line-to-mobile calls). The voice quality degradation may be overcome if the decoding/encoding step is avoided in the cellular infrastructure. In a bypass mode of operation, the cellular infrastructure receives the compressed speech from the transmitting mobile and transmits it directly, without decoding/encoding, to the receiving mobile. The receiving mobile then decodes the speech as normal. But, without some indication that the vocoder operation should be bypassed in the cellular infrastructure, tandem vocoding takes place. Because of the significant effect that tandem vocoding has on voice quality, cellular system operators insist on having a bypass mode of operation.

In Code Division Multiple Access (CDMA) systems, the current standard IS-634 (MSC-BSS A+ Interface) has provisions for out-of-band control of vocoder bypass. The standard defines messages that the mobile switching center (MSC) can send to the base station controller (BSC) to enable or disable vocoder bypass.

The mechanism defined in the standard places full vocoder bypass control under the MSC domain. This allows a simple method for establishing bypass for calls that reside fully under a single MSC. Significant messaging complexities and resulting setup delays are introduced, however, when the parties involved reside on different MSC's.

In-band vocoder bypass signaling has been proposed to simplify the bypass setup procedures for inter-MSC calls. The inband signaling techniques to date, however, offer little advantage over the out-of-band approach due to the complexity of the messaging protocols. For example, the standard proposed by ETSI for Global System for Mobile Communications (GSM) "Tandem Free Operation" (i.e., vocoder bypass), is an in-band control approach to vocoder bypass operation. The standard specifies a set of in-band signaling messages to be sent between two BSC's for control of vocoder bypass. A single in-band channel for vocoder bypass signaling is allocated in the 64 kbps PCM compressed speech time slot. Specifically, the two least significant bits (LSBs) are allocated, i.e., stolen, for this channel. The bottom LSB, bit 0, is stolen at 8000/16=500 bps continuously.

Another proposal calls for stealing at 8 kilobits/second (kbps) bursts. After establishing a bypass circuit, speech frames are sent in bit 1 and bit 0. The signaling information is not sent during bypass operation. This requires that the initial "TREQ" message requesting bypass operation must be explicitly acknowledged by a "TACK" signaling message before coded speech may be sent, i.e., bypass operation undertaken. The result is a complicated multi-state protocol with many timers and counters to track message sequencing. Furthermore, "special case" logic is required throughout to handle the fact that one BSC may advance to the next state before the other BSC. For example, in the BSC associated with sending the TREQ message is a timer to limit the number of times the TREQ message is sent, a timer to time out waiting to receive the TACK message, and logic to handle receiving the next state's message, TACK, prior to receiving the TREQ. The number and complexity of states in the proposed protocol cause transition times to be proportionally lengthy. The complexity also leads to difficulty monitoring and trouble-shooting subsystem operation.

As mentioned, the proposed protocols have substantial transition times from tandem vocoding to vocoder bypass mode of operation. For example, using a 500 bps continuous signaling control channel, transition time at a minimum may be as long as 240 milliseconds (ms). If negotiation of vocoder type is required, the transition time is even longer. Using an 8 kbps burst signaling control channel, a worst case transition time may be on the order of 1.5 seconds or more. And again, vocoder negotiation, if necessary, is not included in this estimated transition time.

Thus, there is a need for an improved method and apparatus for control of vocoder bypass utilizing inband signaling.

DETAILED DESCRIPTION OF A PREFERRED EMBODIMENT

The present invention provides a method and apparatus for control of vocoder bypass utilizing in-band signaling in a wireless communication system. The wireless communication system provides communication services between a first mobile station and a second mobile station. The first mobile and the second mobile each include a mobile vocoder. The wireless communication system includes a vocoder active mode of operation and a vocoder bypass mode of operation. The present invention provides a method of transitioning the wireless communication system from vocoder active mode of operation to the vocoder bypass mode of operation. This is accomplished by providing a vocoder type portion within a compressed speech signal. The vocoder type portion is capable of including a first signal and an encoded speech signal. The vocoder type portion is detected within the compressed speech signal. A compatibility of the first mobile vocoder and the second mobile vocoder is determined based at least upon the vocoder type information. Finally, the vocoder bypass mode of operation is initiated based upon the compatibility.

Figure 1:
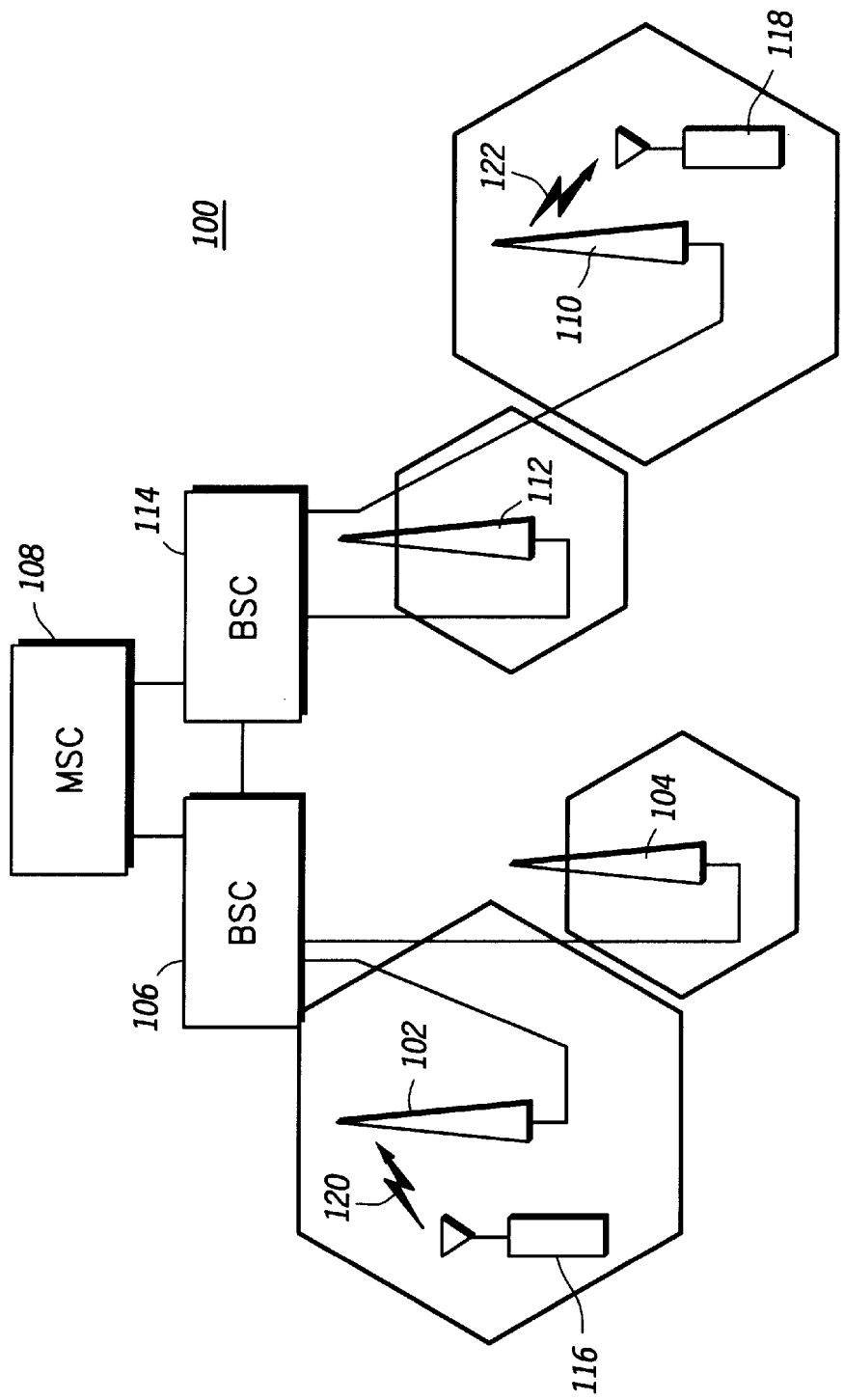
FIG. 1 is a block diagram of a wireless communication system operable in accordance with the preferred embodiments of the present invention.

The present invention can be better understood with reference to FIGS. 1–5. FIG. 1 depicts a communication system 100 that preferably operates in accordance with a Code Division Multiple Access (CDMA) system protocol (e.g., IS-95-A). It will be appreciated that communication system 100 may alternatively or additionally operate in accordance with other analog, digital or dual-mode communication system protocols such as, but not limited to, the Narrowband Advanced Mobile Phone System (NAMPS), the Advanced Mobile Phone System (AMPS), the Global System for Mobile Communications (GSM), the Personal Digital Communications (PDC), or the United States Digital Cellular (USDC) protocols.

Communication system 100 includes a base transceiver station (BTS) 102 and a BTS 104 with associated coverage areas suitably coupled to a base station controller (BSC) 106. Communication system 100 further includes additional base transceiver stations such as BTS 110 and BTS 112 with associated coverage areas suitably coupled to a base station controller, BSC 114. Each of BSC 106 and BSC 114 are coupled to mobile switching center (MSC) 108 as is well known in the art and are also be coupled to each other. In a preferred embodiment of the present invention each BTS 102, 104, 110 and 112 is a Motorola SC9600 base station system, MSC 108 is preferably a Motorola EMX2500 MSC, and each BSC 106 and 114 is preferably a Motorola SG112BBF CBSC component.

A mobile station (mobile) 116 operating in the coverage area of BTS 102 transmits compressed speech in an uplink signal 120 to BTS 102 and hence to BSC 106. The termination for the call is a mobile 118 operating in the coverage area of BTS 112 associated with BSC 114. Mobile 118 receives a compressed speech downlink signal 122 from BTS 112. Each mobile 116 and 118 is preferably a mobile radiotelephone such as a cellular radiotelephone or a personal communication system (PCS) handset. BSC 106 includes a speech coder/decoder (vocoder) which, absent vocoder bypass mode of operation, operates on uplink signal 120 to decompress/decode the speech for further transmission to elements within communication system 100, and namely, to BSC 114. BSC 114 then operates on the decompressed speech to compress/code the speech for transmission as downlink signal 122. Providing each of mobile 116 and mobile 118 have compatible vocoders, the decoding/coding process is unnecessary, resulting in inefficient use of network resources and significant degradation of voice quality.

Figure 2:
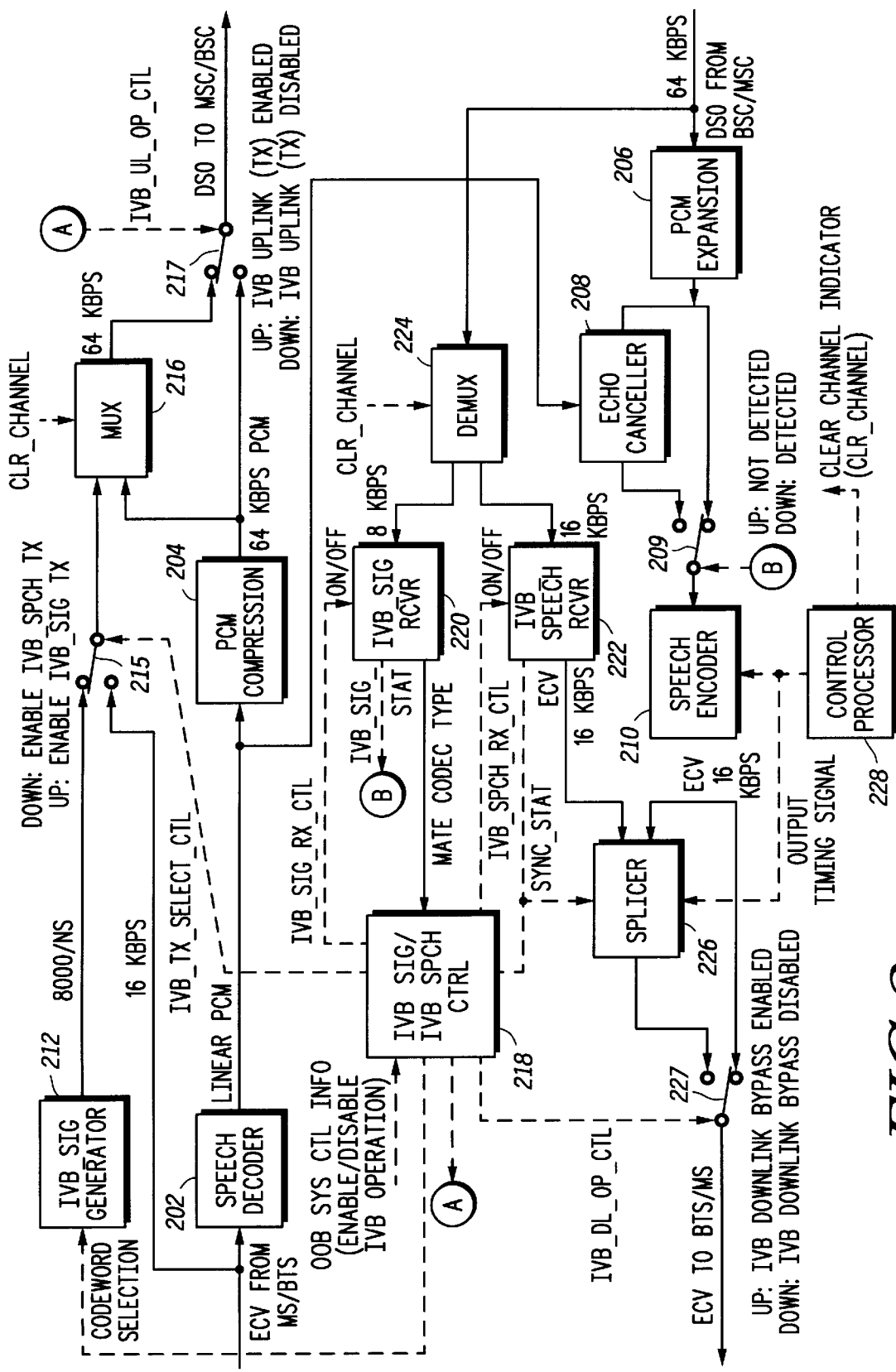
FIG. 2 is a block diagram of an apparatus for vocoder bypass in accordance with a preferred embodiment of the present invention.

In accordance with a preferred embodiment of the present invention, an apparatus and method for vocoder bypass provides in-band signaling for establishing a vocoder bypass mode of operation, i.e., a vocoder bypass circuit. With reference to FIG. 2, a vocoder 200 in accordance with a preferred embodiment of the present invention is shown. Certain elements of vocoder 200 are common and well known in the art and include speech decoder 202, PCM compressor 204, PCM expander 206, echo canceller 208 and speech encoder 210. In a mode of operation without vocoder bypass, these elements function in the normally intended manner to perform coding and decoding of speech. More particularly, and with continued reference to FIG. 2, in the uplink or in a reverse direction, coded speech (ECV) is received from a mobile/BTS and is decoded by speech decoder 202. The resulting stream of linear pulse code modulated (PCM) speech is then compressed to 64 kilobits/sec (kbps) PCM speech by PCM compressor 204. The 64 kbps PCM speech is then communicated to the MSC or other system elements such as another BSC in the network. In the downlink or in a reverse direction, 64 kbps PCM speech is received from the MSC or other system elements and expanded to linear PCM by PCM expander 206. The linear PCM is then operated on by echo canceller 208 and is then coded by speech encoder 210. The coded speech is then communicated to the downlink BTS and to the mobile.

As previously noted, in the mobile-to-mobile call context it is desirable to bypass the decoding/coding operations to at least preserve voice quality. In accordance with a preferred embodiment of the present invention, two bi-directional communication channels are defined for in-band vocoder bypass (IVB) signaling and control. The first is referred to herein as the IVB_SIG channel and is used to communicate control signaling, provide bypass circuit type identification, vocoder type identification, and speech frame timing reference. The second is referred to herein as the IVB_SPEECH channel and is used to carry coded speech frames in the vocoder bypass mode of operation as well as vocoder type identification..

For systems using clear channel spans such as E1 spans, the IVB_SIG channel is implemented in the compressed speech by bit stealing bit 0, b0, from the 64 kbps PCM speech time slot. Referring to Table I below, bits b7-b0 of this time slot contain PCM speech sample bits p7-p0, respectively. The IVB_SIG channel steals the bit 0, b0, every 11th sample (i.e., every 11th frame for a preset duration), and replaces it with an IVB_SIG bit, s0.

TABLE I

IVB_SIG Channel Bit (s0) Allocation
(Clear Channel Span Mapping)

| b7 | b6 | b5 | b4 | b3 | b2 | b1 | b0 |
|---|---|---|---|---|---|---|---|
| p7 | p6 | p5 | p4 | p3 | p2 | p1 | p0/s0 |

During vocoder bypass mode of operation, the IVB_SPEECH channel is carried in bit 1 and bit 0, b1 and b0, of the 64 kbps PCM speech time slot by overwriting the PCM speech bits p1 and p0, as illustrated in Table II below. As seen in Table II, during vocoder bypass mode of operation, bit 1 and bit 0 contain the IVB_SPEECH channel, and bit 7-bit 2 contain the most significant bits (MSBs) of the compressed 64 kbps PCM speech sample, p7-p2, respectively.

TABLE II

IVB_SPEECH Channel Bits (d1:d0) Allocation
(Clear Channel Span Mapping)

| b7 | b6 | b5 | b4 | b3 | b2 | b1 | b0 |
|----|----|----|----|----|----|----|----|
| p7 | p6 | p5 | p4 | p3 | p2 | d1 | d0 |

For systems using non-clear channel spans such as 56K T1 spans, the inband signaling protocol and encoded speech frames are preferably conveyed in an identical manner as clear channel spans, with the only exception that the second bit position (b1) is preferably used to carry the inband signaling and the third bit position and second bit position, b2 and b1 respectively, are used to carry the encoded speech frames(see Tables III and IV). The shift in bit positions is necessary in order to avoid conflict with T1 signaling, which bit robs the least significant bit (b0) every sixth frame.

TABLE III

IVB_SIG Channel Bit (s1) Allocation
(Non-Clear Channel Span Mapping)

| b7 | b6 | b5 | b4 | b3 | b2 | b1 | b0 |
|----|----|----|----|----|----|----|----|
| p7 | p6 | p5 | p4 | p3 | p2 | p1/s1 | p0 |

TABLE IV

IVB_SPEECH Channel Bits (d1:d0) Allocation
(Non-Clear Channel Span Mapping)

| b7 | b6 | b5 | b4 | b3 | b2 | b1 | b0 |
|----|----|----|----|----|----|----|----|
| p7 | p6 | p5 | p4 | p3 | d1 | d0 | p0 |

In providing these signaling channels, as will be explained, the unexpected result of reduced system complexity and reduced transition time is obtained. Furthermore, each of the signaling channel protocols are arranged to reduce impact on voice quality during setup of vocoder bypass mode of operation, to provide fast establishment of vocoder bypass mode of operation and to further provide fast recovery from and transition back to tandem vocoder operation.

Vocoder bypass operating mode is enabled by an out-of-band system control message. By default, the inband signaling mechanism is disabled. As a result, vocoder bypass mode cannot be established unless the MSC enables the inband signaling mechanism via an out-of-band message. Out-of-band messaging is used to enable/disable inband signaling. This provides a safeguard against entering vocoder bypass mode when conditions do not favor reliable vocoder bypass operation. For example, vocoder bypass operation would not be desirable during three party conferencing or when a call is routed over trunks that are known to support echo cancellation. Typically, out-of-band control would only be necessary during call setup. Further control of vocoder bypass mode would rely on inband signaling procedures.

Enabling vocoder bypass operating mode via out-of-bank messaging initializes the IVB_SIG channel, which is then transmitted as a "beacon" for in-band detection of a mobile-to-mobile circuit and to provide a speech frame timing reference. The IVB_SIG is transmitted for a preset duration long enough to allow exchange of service option information with the mate party. The IVB_SIG channel is also transmitted if the service option changes during the course of the call or whenever encoded speech synchronization with the mate party is lost.

The IVB_SPEECH channel is preferably only transmitted during vocoder bypass mode of operation. Since the IVB_SIG channel shares a DS0 bit with the IVB_SPEECH, IVB_SIG signaling is preferably turned off whenever in vocoder bypass mode. During vocoder bypass mode, the vocoder type information that is normally conveyed via IVB_SIG is now carried via the IVB_SPEECH channel.

Data sent in the IVB_SIG channel is one of a plurality of long codewords. Long codewords are transmitted on the IVB_SIG channel to reliably synchronize the IVB_SIG channel to the receiver and to provide an adequate degree of falsing protection. Table IV provides examples of preferred codewords by name and associated meaning. Of course, it is well within the skill of one having ordinary skill in the art to adopt a suitable hex value for each codeword given a number of available codeword bits.

TABLE V

IVB_SIG Codeword Examples

| Codeword Name | Codeword Meaning |
|---------------|------------------|
| ANN_IVB (8k-qcelp) | announces IVB circuit, and indicates current vocoder type is 8k qcelp |
| ANN_IVB (13k-qcelp) | announces IVB circuit, and indicates current vocoder type is 13k qcelp |
| ANN_IVB (evrc) | announces IVB circuit, and indicates current vocoder type is evrc |
| ANN_IVB (reserved) | announces IVB circuit, and indicates current vocoder type is (reserved) |

In operation, a receiving BSC detects and decodes the IVB-SIG long codewords using an IVB_SIG channel receiver discussed more fully below with respect to FIG. 2 and FIG. 3. The transmitting BSC must generate and format the IVB_SIG codewords and the IVB_SIG channel. An IVB state machine, discussed below with respect to FIG. 4, controls the transition into and out of vocoder bypass operation.

With reference again to FIG. 2, vocoder 200 includes in addition to the previously described elements an IVB_SIG channel generator 212, a multiplexer 216, control 218, an IVB_SIG channel receiver 220, an IVB_SPEECH receiver 222, a demultiplexer 224 and a splicer 226. Also provided are switch 217 and switch 227 which are responsive to the out-of-band IVB enable message to enable bypass vocoder operation. More particularly, switch 217 couples IVB_SIG generator 212 into the uplink circuit and its output is multiplexed with the compressed speech by multiplexer 216. If the CLR_CHANNEL signal is TRUE, that is, E1 spans, the output of multiplexer 216 at this point is the IVB_SIG channel signal in bit 0, b0, of the compressed speech with bits 7-1 containing compressed speech. If the CLR_CHANNEL signal is FALSE, that is 56 K T1 spans, the output of multiplexer 216 at this point is the IVB_SIG channel signal in bit 1, b1, of the compressed speech with remaining bits including compressed speech.

IVB_SIG generator 212 is responsive to a codeword selection signal from control 218 to generate the correct codeword. In the bypass mode of operation, switch 215 is responsive to a signal from control 218 indicating matching codewords, i.e., the vocoders are the same type, to couple the coded speech (IVB_SPEECH) to multiplexer 216.

Up to 2 bits of the PCM samples may be overwritten to contain the IVB_SIG channel or the IVB_SPEECH channel. If CLR_CHANNEL is TRUE, with IVB enabled, the IVB_SIG channel is present conditionally with bit 0, b0, of the PCM speech overwritten with the IVB_SIG bit, s1, at the rate of $8000/N_s$, or 727 bits per second (bps) bit stealing with $N_s=11$. The value $N_s=11$ is preferred and is selected to ensure proper error correction, although it will be appreciated that other suitable values of Ns may be selected without departing from the fair scope of the present invention. Until bypass mode of operation is actually initiated, bit 1 and bit 0 of the 64 kbps PCM speech time slot still contain PCM speech. During vocoder bypass operation, bits 1 and 0 are overwritten with encoded compressed speech bits at a rate of 16 kbps (every sample), taking the place of the IVB_SIG channel (i.e., turned off).

If CLR_CHANNEL is FLASE, with IVB enabled, the IVB_SIG channel is present conditionally with bit 1, b1, of the PCM speech overwritten with the IVB_SIG bit, s1, at the rate of $8000/N_s$, or 727 bits per second (bps) bit stealing with $N_s=11$. The value $N_s=11$ is preferred and is selected to ensure proper error correction, although it will be appreciated that other suitable values of Ns may be selected without departing from the fair scope of the present invention. Until bypass mode of operation is actually initiated, bit 2 and bit 1 of the 64 kbps PCM speech time slot still contain PCM speech. During vocoder bypass operation, bits 2 and 1 are overwritten with encoded compressed speech bits at a rate of 16 kbps (every sample), taking the place of the IVB_SIG channel (i.e., turned off).

For the remaining discussion, it is assumed that CLR_CHANNEL is TRUE. It should be understood that the same processing could be utilized if CLR_CHANNEL is FALSE, with a shift in bit positions similar to the aforementioned shift. As noted, IVB_SIG channel is initialized by an out-of-band control message (or another event), and IVB_SPEECH is initialized based upon a "CODEC MATCH STAT" signal. The CODEC MATCH STAT signal is generated on the downlink side in response to successfully detecting the IVB_SIG channel long codeword or receive IVB_SPEECH and determining that the vocoders for each of the mobiles match.

In the downlink, with IVB enabled, demultiplexer 224, IVB_SPEECH_RCVR 222 and splicer 226 are coupled into the downlink circuit. With continued reference to FIG. 2, the 64 kbps PCM compressed speech is input to demultiplexer 224 that outputs an 8 kbps stream (bit 0, b0) and a 16 kbps stream (bit 1 and bit 0, b1 and b0) for subsequent processing. IVB_SIG receiver 220 searches for the start of the sub-rate 727 bps codeword within the 8 kbps stream, syncs to it, and decodes the codeword for input to control 218. Control 218 compares the received codeword, and hence the vocoder type identified by the codeword, and generates the CODEC MATCH STAT signal.

Figure 3:
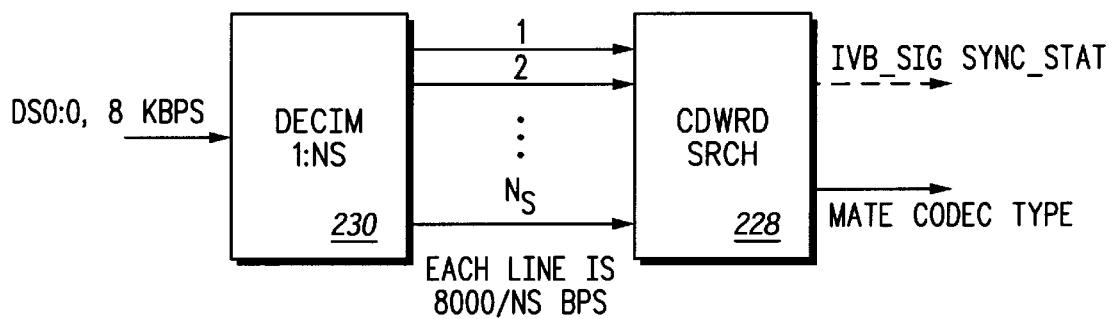
FIG. 3 is a block diagram further illustrating a signaling receiver in accordance with a preferred embodiment of the present invention.

Referring to FIG. 3, IVB_SIG channel receiver 220 includes a sub-subrate demultiplexer 228 and a synchronization searcher 230. The 8 kbps subrate stream (bit 0 of the compressed speech) is fed into sub subrate demultiplexer 228 which breaks out $N_s$ ($N_s=11$), $8000/N_s=727$ bps streams, any one of which may contain the IVB_SIG channel. Every channel is searched for the presence of one of the $N_{cw}=3$ codewords. The outputs are a control signal indicating whether the codeword has been found (IVB_SIG_SYNC_STAT) and the vocoder type identified by the codeword which is communicated to control 218.

Referring again to FIG. 2, switch 209 is responsive to detection of the IVB_SIG SYNC STAT control signal for uncoupling echo canceller 208 from the downlink circuit and for directly coupling the downlink expanded PCM speech to the speech encoder. IVB_SPEECH RCVR 222, upon receipt of the CODEC MATCH STAT signal, sends 16 kbps encoded speech to splicer 226 and a coded speech (ECV) SYNC STAT signal. Splicer 226 is responsive to the coded speech SYNC STAT to provided synchronized coded speech, either from IVB_SPEECH_RCVR 222 or speech encoder 210, in the downlink to the BTS.

Splicer 226 provides for a seamless transition from/to encoded PCM frames to/from bypass coded frames by coordinating the timing of the switch over from one circuit to the other circuit, e.g., PCM to bypass. The effect of the splicer is to eliminate audible switching artifacts such as audio holes, clicks and other distortions. The OUTPUT_REQUIRED_BY timing signal is provided by a control processor 228 to each of splicer 226 and speech encoder 210, and is the start signal. Splicer 226 actually acts as a distributed function part of which executes prior to speech encoder 210 and is thus able to block the output from speech encoder 210 and switch in IVB_SPCH_RCVR 222 output. The timing is such that speech encoder 210 has just completed sending the previous coded speech frame and has not started to output the current coded speech frame. The bypass coded speech frame is thus switched in seamlessly. It should be noted that the bypass coded speech frames are transmitted with minimal delay in part to facilitate the buffering required in IVB_SPCH_RCVR 222 and splicer 226 for splicer 226 to function.

As will be appreciated, the present invention provides for continuously sending the compressed 64 kbps PCM speech in the bits not occupied by the IVB channels. It further provides for normal speech processing of the speech data. This reduces response time of the various filters upon reverting back to vocoder normal operation. Also, always sending the compressed 64 kbps PCM speech minimizes the impact on voice quality should the bypass circuit output inadvertently be passed through the speech encoder on the receiving side, i.e., bits p7-p2 will otherwise contain compressed speech data.

Splicer 226 also guards against transitions from full rate to eighth rate frames when transitioning from encoded speech output to bypass coded speech output, and vice versa. This is accomplished by waiting until a non-full rate frame was sent on the previous frame, frame n−1, before switching to the new mode, i.e., vocoder bypass mode of operation to normal mode of operation or normal mode of operation to vocoder bypass mode of operation, for sending the current frame, frame n. If frame n−1 sent in mode x (bypass or normal) was full rate, then frame n will not be sent in mode y (the alternate to bypass or normal), except in the following case. A counter for the number of continuous full rate frames sent in mode x while trying to transition from mode y is initialized and incremented for each full rate frame. If this count exceeds a threshold, for example a threshold of 10, then the switch to the new mode is made and the current frame available in the new mode is sent and the new mode is entered.

Figure 4:
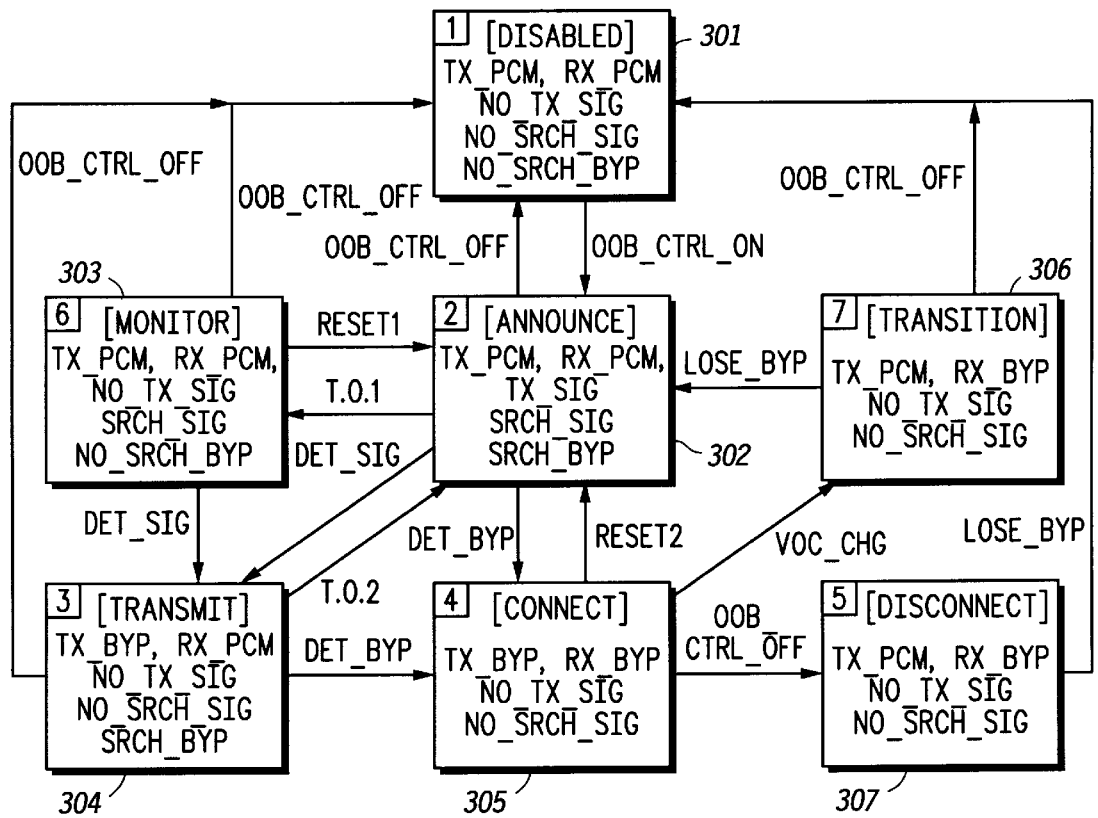
FIG. 4 is a state transition diagram illustrating a method of vocoder bypass in accordance with a preferred embodiment of the present invention.

With reference now to FIG. 4, operation of vocoder 200 is described in view of the illustrated state diagrams 400. FIG. 4 depicts the inband signaling protocol executed when the mechanism has been enabled via out-of-band signaling, such as with a Transcoder Control Request.

In the [ANNOUNCE] state 302, the ANN_IVB codeword corresponding to the current local vocoder type (hereafter referred to as the "correct ANN_IVB codeword") is both transmitted, on the IVB_SIG transmit channel, and searched for, in the IVB_SIG receive channel. In addition, encoded speech of vocoder type equal to the current local vocoder type (hereafter referred to as the "correct vocoder type") is searched for in the IVB_SPEECH receive channel. The system remains in this state, i.e., continues the process of sending and searching for the ANN_IVB codeword, and searching for encoded speech of the correct vocoder type, until either the correct ANN_IVB codeword is received, or encoded speech of the correct vocoder type is received, or a time interval of nominally 2.5 seconds elapses, or the inband signaling state machine is disabled via a control message received from outside.

In the case of receiving the correct ANN_IVB codeword in the IVB_SIG channel, then the next state is [TRANSMIT] 304. In the case of receiving encoded speech of the correct vocoder type in the IVB_SPEECH channel, then the next state is [CONNECT] 305. In the case of the time interval elapsing, the next state is [MONITOR] 303. In the case of receiving a "disable" control message, the next state is [DISABLED] 301. In all cases, transmission of ANN_IVB codeword on the IVB_SIG transmit channel ceases upon exiting the [ANNOUNCE] 302 state. In other words, the IVB_SIG transmit channel is not active in any other state.

In the [TRANSMIT] state 304, encoded speech received from the mobile is transmitted on the IVB_SPEECH transmit channel, and encoded speech of the correct vocoder type is searched for in the IVB_SPEECH receive channel. The system remains in this state, i.e., it continues the process of sending and searching for encoded speech as described above until either encoded speech of the correct vocoder type is received in the IVB_SPEECH receive channel, or a time interval of nominally 80 ms elapses. In the former case, the next state is [CONNECT] 305; in the latter case the next state is [ANNOUNCE] 302.

In the [MONITOR] state 303, the IVB_SIG receive channel is monitored by searching for the correct ANN_IVB codeword. The system remains in this state until either the current local vocoder type changes, the inband signaling state machine is re-started or disabled via a control message received from outside, or the correct ANN_IVB codeword is received on the IVB_SIG receive channel. In the cases of local vocoder type changing or the state machine being re-started via control message from outside, then the next state is [ANNOUNCE] 302. In the case of receiving the correct ANN_IVB codeword in the IVB_SIG channel, then the next state is [TRANSMIT] 304. In the case of the state machine being disabled via a control message from outside, then the next state is [DISABLED] 301.

In the [CONNECT] state 305, encoded speech received from the mobile is transmitted on the IVB_SPEECH transmit channel, and encoded speech of the correct vocoder type received in the IVB_SPEECH receive channel is reformatted for transmission to the mobile. The system remains in this state, i.e., continues the process of sending encoded speech on the IVB_SPEECH transmit channel, receiving encoded speech in the IVB_SPEECH receive channel and forwarding the received encoded speech to the mobile, until either encoded speech of an incorrect vocoder type is received on the IVB_SPEECH receive channel, synchronization to encoded speech on the IVB_SPEECH receive channel is lost, the current local vocoder type changes, or a control message to disable the state machine is received from outside. In the cases of receiving encoded speech of an incorrect vocoder type on the IVB_SPEECH receive channel or losing sync to encoded speech on the IVB_SPEECH receive channel, then the next state is [ANNOUNCE] 302. In the cases of local vocoder type changing, then the next state is [TRANSITION] 306. In the case of receiving a control message to disable the state machine, then the next state is [DISCONNECT] 307.

In the [TRANSITION] state 306, encoded speech of the correct vocoder type received in the IVB_SPEECH receive channel is reformatted for transmission to the mobile. The system remains in this state until loss of sync to encoded speech on the IVB_SPEECH receive channel occurs, upon which the next state is [ANNOUNCE] 302.

In the [DISCONNECT] state 307, encoded speech of the correct vocoder type received in the IVB_SPEECH receive channel is reformatted for transmission to the mobile. The system remains in this state until loss of sync to encoded speech on the IVB_SPEECH receive channel occurs, upon which the next state is [DISABLED] 301.

Figure 5:
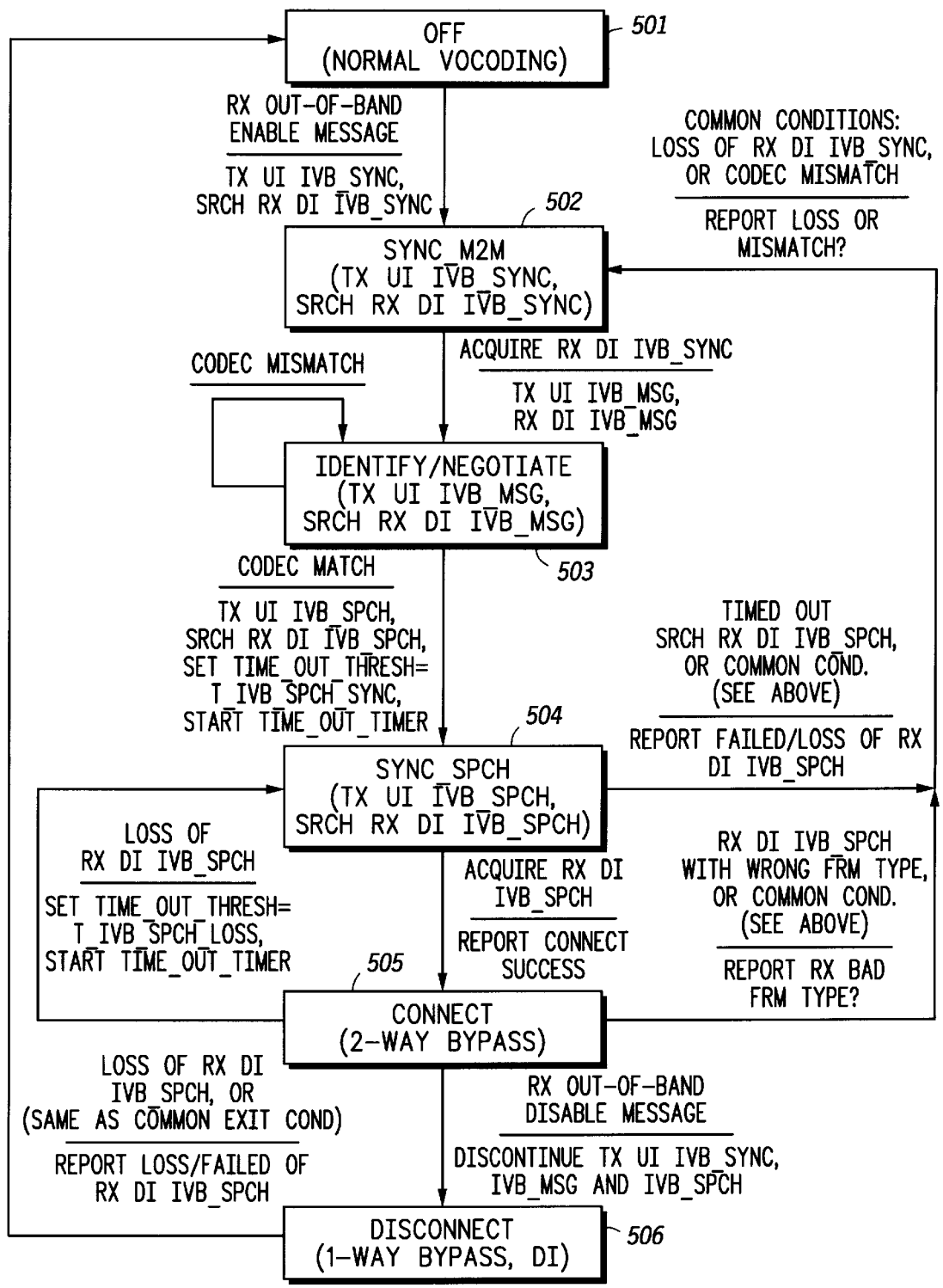
FIG. 5 is a state transition diagram illustrating a method of vocoder bypass in accordance with an alternate preferred embodiment of the present invention.

Referring now to FIG. 5, in accordance with an alternate preferred embodiment of the present invention, three signaling channels are again provided for identifying and controlling vocoder bypass mode of operation. Two features of the alternate embodiment are reduced complexity, and associated reduced processing overhead, of the initial search for synchronization signaling, and enhanced compatibility with other call processing features, for example, echo cancellers.

A first of the signaling channels, IVB_SYNC, is used to identify a mobile-to-mobile communication and that the mobiles are equipped to handle vocoder bypass. The IVB_SYNC channel, with IVB enabled, continuously sends a single, repeating bit pattern in bit 0, b0, of the 64 kbps PCM speech time slot at 727 bps (i.e., 1:11 bit stealing). The bit pattern is chosen sufficiently long to be immune to bit errors and corruption, but also short enough to provide quick detection. A 29 or 30 bit pattern is presently preferred, although it will be appreciated other bit pattern lengths may be used without departing from the fair scope of the present invention. Unlike IVB_SIG, IVB_SYNC does not contain vocoder type information. Therefore, it has a much lower initial detection overhead. As will be further described, the IVB_SYNC channel is also used in demultiplexing a second of the signaling channels, the IVB_MSG channel.

The IVB_MSG channel is used to convey the vocoder type information. The IVB_MSG channel is also sent using bit stealing at a preferred rate of 727 bps, (1:11 bit stealing). Unlike the IVB_SYNC channel, IVB_MSG is not sent continuously. At the appropriate times, as will be described, the IVB_MSG channel is generated and sent in order to provide vocoder type identification and for use in negotiating changes in vocoder type. Therefore, in the preferred embodiment of the IVB_MSG channel, it shares bit 1, b1, with the third channel, IVB_SPEECH.

To further reduce the impact on overall sound quality, e.g., both during high speech activity and during quiet periods, the IVB_MSG channel may be coordinated to periods of high speech activity or low speech activity depending on the system. For example, it may be desirable to coordinate the IVB_MSG channel to be sent during period of low speech activity in order to reduce audible impact on the PCM speech. However, if generated noise due to the bit stealing is excessive and/or overly objectionable, it is possible to coordinate the IVB_MSG channel with periods of high speech activity where the impact on voice quality may not be objectionable, due to the "masking effect."

The IVB_SPEECH channel is implemented as described above and steals bits at a 16 kbps rate in bit 1 and bit 0, b1 and b0, of the 64 kbps PCM speech time slot. By providing sharing of bit 1, b1, between the IVB_MSG channel and the IVB_SPEECH channel, any impact on the PCM speech, and/or on the quiet periods of low speech activity is virtually eliminated.

With reference then to FIG. 58, initially IVB is not enabled represented by the OFF state 501. OFF state 501 is entered based upon an out-of-band IVB disable signal and/or upon initialization of communication system 100. In OFF state 501, there is no IVB information transmitted in the uplink 64 kbps PCM speech nor searched/tracked in the downlink 64 kbps PCM speech. In OFF state, normal vocoder operation occurs.

When enabled, the SYNC_M2M (synchronize mobile-to-mobile circuit) state 502 is entered. In SYNC_M2M state 502, an IBV_SYNC transmitter (similar to IVB_SIG generator 202 shown in FIG. 2) sends an IVB_SYNC codeword starting exactly every 40 ms, i.e., starting every 320th PCM sample) and thus in exact synchronization with the start of every other decoded speech frame of PCM samples. This is done to facilitate the detection and demultiplexing of the IVB_MSG channel at an IVB sync receiver (similar to IVB_RCVR 220). The IVB_MSG channel is sent in synchronization with the IVB_SYNC channel. The IVB_SYNC codeword is inverted to indicate to the receiver that IVB_MSG channel bits are present during the corresponding time interval. The IVB_SYNC codeword bits can be inverted on a half codeword basis. For example, with $N_{cb}=29$, the first 15 codeword bits may be inverted and the remaining 14 codeword bits left as is. Alternatively, the first 15 codeword bits may be left as is and the remaining 14 codeword bits inverted. This allows the IVB_MSG channel to be active on a 20 ms basis. The receiver searches for the various codeword inversions which may represent: 1) no bits inverted—IVB_MSG channel not present, 2) first 15 bits inverted—IVB_MSG channel present in first 20 ms interval, 3) second 14 bits inverted—IVB_MSG channel present in second 20 ms interval and 4) all 29 bits inverted—2 consecutive IVB_MSG channels present. Furthermore, the IVB_SYNC channel receiver adjusts its timing every 40 ms to account for the non-integer denominator relationship of the bit steal interval (11) to the codeword period (320).

When a non-inverted IVB_SYNC pattern is detected, SYNC_M2M state is exited and the IDENTIFY/NEGOTIATE state 503 is entered. In IDENTIFY/NEGOTIATE state 503, vocoder information is communicated in the IVB_MSG channel. IDENTIFY/NEGOTIATE state 503 is maintained until matching vocoder type information is received on the IVB_MSG channel. Optionally, the IVB_MSG channel may be used to negotiate vocoder type in the case of originally mismatched vocoder types. The negotiation may be a procedure as described above, or vocoder type information may be provided on the IVB_MSG channel to provide an "implied rule database" solution. When matching vocoder type information is received, the SYNC_SPCH state 504 is entered.

In SYNC_SPCH state 504, coded speech is sent in the IVB_SPEECH channel. Coded speech is also searched for in the downlink PCM speech. The IVB_SYNC and IVB_MSG channels are still observed in the event a vocoder type change is required and/or bypass mode of operation must be disabled. While in SYNC_SPCH state 504, the vocoder continues to execute and supplies decoded speech output to the uplink PCM speech and encoded PCM speech to the downlink.

When synchronization to coded speech is obtained, the CONNECT state 505 is entered. In CONNECT state 505, the IVB circuit is completed and bypass coded speech is communicated between the mobiles. The vocoder continues to run in parallel to vocoder bypass to support seamless switching back to bypass disabled (normal vocoding) mode. CONNECT state 505 is maintained until either sync to bypass coded speech is lost, an out-of-band disable command is received, the IVB_SYNC channel is lost, non-matching vocoder type information is received on the IVB_MSG channel or coded speech frames not compatible with the current vocoder are received.

From CONNECT state 505, and upon receipt of a disable command, the DISCONNECT state 506 is entered. In DISCONNECT state 506, all uplink IVB transmit processing is discontinued and normal vocoding is restored. Downlink bypass of coded speech received is still supported. This 1-way, "half-duplex" mode of operation is maintained until there is a loss of sync to downlink coded speech or any other IVB receive loss condition occurs.

As will be appreciated, the alternate preferred embodiment provides lower detection overhead while still providing the advantages of fast transition to vocoder bypass mode of operation. It should be further appreciated that modification of vocoder 200 to perform in accordance with the above-described alternate preferred embodiment is easily accomplished.

While this invention has been described in terms of certain examples thereof, it is not intended that it be limited to the above description, but rather only to the extent set forth in the claims that follow.

We claim:

1. In a wireless communication system providing communication services between a first mobile and a second mobile, the first mobile having a first mobile vocoder, the second mobile having a second mobile vocoder and the wireless communication system having a vocoder active mode of operation and a vocoder bypass mode of operation, a method of transitioning the wireless communication system from vocoder active mode of operation to the vocoder bypass mode of operation, the method comprising the steps of:

providing a vocoder bypass portion within a compressed speech signal, the vocoder bypass portion capable of including a first signal and an encoded speech signal, the first signal including a vocoder bypass capability information and a vocoder type information, the encoded speech signal including the vocoder type information;

detecting the vocoder bypass portion within the compressed speech signal;

determining a compatibility of the first mobile vocoder and the second mobile vocoder based at least upon the vocoder type information; and initiating the vocoder bypass mode of operation based upon the compatibility;

wherein the positioning of at least one of the first signal and the encoded speech signal within the compressed speech signal is dependent upon at least a user-controlled signal.

2. The method of claim 1, further comprising the step of ceasing provision of the first signal within the compressed speech signal.

3. The method of claim 2, wherein the step of ceasing provision of the first signal within the compressed speech signal comprises the step of ceasing provision of the first signal within the compressed speech signal upon the expiration of a timer.

4. The method of claim 2, wherein the step of ceasing provision of the first signal within the compressed speech signal comprises the step of ceasing provision of the first signal within the compressed speech signal upon determining that the vocoder bypass mode of operation has been initiated.

5. The method of claim 1, the first signal including synchronization information.

6. The method of claim 1, the encoded speech signal including synchronization information.

7. The method of claim 1, the vocoder bypass mode of operation further comprising providing encoded speech information within the compressed speech channel and at a subrate thereof.

8. The method of claim 1, wherein the vocoder type information comprises a first mobile vocoder type and a second mobile vocoder type, and the step of determining a compatibility comprises comparing the first mobile vocoder type with the second mobile vocoder type.

9. The method of claim 1, further comprising the step of providing the first signal within the compressed speech signal upon detection of an enable out-of-band signaling directive.

10. The method of claim 1, further comprising the step of providing the encoded speech signal within the compressed speech signal upon detection of an enable out-of-band signaling directive.

11. The method of claim 1, further comprising the step of ceasing provision of the first signal within the compressed speech signal upon detection of a disable out-of-band signaling directive.

12. The method of claim 1, further comprising the step of ceasing provision of the encoded speech signal within the compressed speech signal upon detection of a disable out-of-band signaling directive.

13. In a wireless communication system, an apparatus for providing inband vocoder control comprising:

an inband signal channel generator providing a bypass signal;

a multiplexer coupling the bypass signal into an uplink portion of a speech channel;

a bypass signal detector coupled to the speech channel and providing a detection signal upon detecting the bypass signal or encoded speech within a downlink portion of the speech channel;

a vocoder type detector responsive to the detection signal to provide a vocoder type signal;

a multiplexer, responsive to the vocoder type signal, to couple encoded speech into the uplink portion of the speech channel; and a splicer to couple the encoded speech into a downlink portion of the speech channel.

14. The apparatus of claim 13, wherein the bypass signal comprises at least one of synchronization information and vocoder type information.

15. The apparatus of claim 13, comprising:

a demultiplexer coupled to the downlink portion of the speech channel and arranged to separate a bypass signal portion and an encoded speech signal portion;

a bypass signal receiver coupled to the demultiplexer to receive the bypass signal portion and to generate a bypass signal statistic;

an encoded speech signal receiver coupled to the demultiplexer to receive the encoded speech signal portion and to generate an encoded speech signal statistic; and the splicer responsive to the encoded speech signal statistic to couple the encoded speech into the downlink portion of the speech channel.

16. In a wireless communication system, the wireless communication system having a vocoder mode of operation and a vocoder bypass mode of operation, a method for inband signaling control of the vocoder bypass mode of operation, the method comprising the steps of:

in the vocoder active mode of operation:
receiving a coded first signal from a mobile, decoding the coded first signal to create a decoded first signal and coupling the decoded first signal into a speech channel in a first direction;

receiving a decoded second signal in the speech channel in a second direction, coding the decoded second signal and transmitting the coded second signal to the mobile;

generating a first bypass signal and embedding the first bypass signal into the speech channel in the first direction and generating a second bypass signal and embedding the second bypass signal into the speech channel in the second direction;

upon detecting either the first bypass signal or the second bypass signal in the speech channel, determining a vocoder compatibility; and upon determining the vocoder compatibility entering the second mode of operation;

in the second mode of operation:
receiving the coded first signal from the mobile and coupling the coded first signal into the speech channel in the first direction; and receiving a coded second signal in the speech channel in the second direction and transmitting the coded second signal to the mobile.

17. The method of claim 16, the first bypass signal containing first vocoder type information, the second bypass signal containing second vocoder type information, and the step of determining a vocoder compatibility comprising comparing the first vocoder type information and the second vocoder type information.

18. The method of claim 16, further comprising in the second mode of operation the steps of providing a first vocoder type information signal in the speech channel in the first direction and providing a second vocoder type information signal in the speech channel in the second direction, and the step of determining a vocoder compatibility comprising comparing the first vocoder type information and the second vocoder type information.

19. The method of claim 16, wherein each of the first bypass signal and the second bypass signal contain synchronization information.

20. The method of claim 16, further comprising concomitantly generating the first bypass signal and embedding the first bypass signal into the speech channel in the first direction and generating the second bypass signal and embedding the second bypass signal into the speech channel in the second direction.

21. The method of claim 16, further comprising concomitantly generating the coded first signal and embedding the coded first signal into the speech channel in the first direction and generating the coded second signal and embedding the coded second signal into the speech channel in the second direction.

* * * * *